United States Patent [19]

Clark et al.

[11] Patent Number: 4,490,729

[45] Date of Patent: Dec. 25, 1984

[54] INK JET PRINTER

[75] Inventors: Frederic L. Clark, Plano; David B. Wallace, Dallas, both of Tex.

[73] Assignee: The Mead Corporation, Dayton, Ohio

[21] Appl. No.: 418,363

[22] Filed: Sep. 15, 1982

[51] Int. Cl.³ .............................................. G01D 15/18

[52] U.S. Cl. .................................. 346/75; 346/140 R

[58] Field of Search .............................. 346/75, 140 IJ

[56] References Cited

U.S. PATENT DOCUMENTS

| | | | |
|---|---|---|---|
| 3,562,757 | 2/1971 | Bischoff | 346/1 |
| 3,596,275 | 7/1971 | Sweet | 346/1 |
| 3,739,395 | 6/1973 | King | 346/75 |
| 3,789,422 | 1/1974 | Haskell et al. | 346/75 |
| 3,827,057 | 7/1974 | Bischoff et al. | 346/75 |
| 3,828,354 | 8/1974 | Hilton | 346/75 |
| 3,833,910 | 9/1974 | Chen | 346/1 |
| 3,946,399 | 3/1976 | Zaretsky | 346/1 |
| 4,060,804 | 11/1977 | Yamada | 346/75 |
| 4,074,278 | 2/1978 | Robertson | 347/75 |
| 4,080,606 | 3/1978 | Yamada | 346/75 |
| 4,085,409 | 4/1978 | Paranjpe | 346/75 |
| 4,086,601 | 4/1978 | Fillmore et al. | 346/75 |
| 4,157,551 | 6/1979 | Takano et al. | 346/75 |
| 4,229,749 | 10/1980 | Fillmore | 346/75 |
| 4,364,058 | 12/1982 | Tamai | 346/75 |

*Primary Examiner*—E. A. Goldberg
*Assistant Examiner*—Mark Reinhart
*Attorney, Agent, or Firm*—Biebel, French & Nauman

[57] ABSTRACT

An ink jet printer for depositing drops of ink at a plurality of print positions on a moving print receiving medium includes a print head producing at least one jet drop stream directed toward the medium and a charge electrode positioned adjacent the point of drop formation of the jet drop stream. A charging means repetitively applies a high guard drop potential to the charge electrode during formation of at least every second drop for charging of the drops to a guard charge level. During formation of the remainder of the drops, either one of a number of relatively low print potentials or a substantially larger catch potential is applied to the charge electrode. Drops formed during application of a print potential to the electrode may carry a charge of either electrical polarity due the drop-to-drop cross talk from previously formed guard drops. Drops carrying a guard charge level and drops carrying a catch charge level are deflected by an electric field to a catcher, and drops carrying any of the print charge levels are deflected by the field to associated print positions on the medium.

20 Claims, 4 Drawing Figures

INK JET PRINTER

BACKGROUND OF THE INVENTION

The present invention relates to ink jet printers and, more particularly, to a printing apparatus and a printing method in which drops from at least one jet drop stream carry electrical charges of either polarity and are deflected in either of two directions as they subsequently pass through a static electric deflection field.

Ink jet printers such as shown in U.S. Pat. No. 4,085,409, issued Apr. 18, 1978, to Paranjpe, are known in which the drops in one or more jet drop streams are selectively electrically charged at the time that the drops are formed. The drops are formed from a fluid filiment which emerges from a print head. The jet drop stream is directed toward a moving print receiving medium, but an electric field is provided in the path of the jet such that highly charged drops are displaced laterally and directed to strike a drop catching device. The uncharged drops and the drops carrying lesser charges are not deflected or are deflected only slightly by the field and therefore pass through the field, striking the print receiving medium. The Paranjpe patent shows a multiple jet printer in which each jet drop stream services a number of print positions on the print receiving medium due to the drops being charged to a number of different charge levels and therefore deflected in varying amounts.

The jet drop streams are typically formed in an ink jet printer by supplying ink under pressure to the fluid reservoir of a print head. The print head defines a number of orifices, communicating with the fluid reservoir, from which the fluid filiments emerge. Typically, the fluid filiments are mechanically stimulated so as to break up into the streams of drops of uniform size and spacing.

Charging of the drops in a stream is accomplished by positioning a charge electrode adjacent the point of drop formation of the stream and impressing upon the charge electrode an electrical potential which differs from the electrical potential of the fluid filiment. As a consequence, a concentration of electric charge is formed on the tip of the fluid filiment and this charge is carried away by the next formed drop as it breaks from the filiment.

It will be appreciated that accurate drop placement on the print receiving medium is dependent, in part, upon accurate charging of the drops. One source of charge level error is the drops which have been previously formed in the stream. Assuming a drop in the stream carries a charge, the charge induced on the next drop to be formed will be affected both by the voltage on the charge electrode and by the electric charge carried by the previously formed drop. It will be appreciated that the previously formed drop will tend to induce a charge of opposite polarity in the following drop. The previously formed drop will thus offset, to some extent, the charging effect of the voltage applied to the charge electrode. The resulting error in drop charge level produces a deflection of the drop which is less than or greater than anticipated and, as a consequence, a misplacement of the drop on the print receiving medium.

This phenomenon, termed drop-to-drop cross talk, has been compensated in prior art devices by inserting "guard drops" between successive print drops. The guard drops space successive print drops further apart and thereby reduce the drop-to-drop cross talk between print drops. U.S. Pat. No. 3,562,757, issued Feb. 9, 1971, to Bischoff shows a jet drop device in which guard drops are provided between the drops available for deposit on the print receiving medium, with all of the guard drops being uncharged. These uncharged drops act as a shield between successively formed charged drops such that a previously formed charged drop does not adversely affect the level of charge carried by a subsequently formed drop.

U.S. Pat. No. 3,833,910, issued Sept. 3, 1974, to Chen, discloses an ink jet printer in which guard drops are provided between successive print drops. Every alternate drop is selectively charged as necessary for use in printing, and each intervening guard drop is charged with an opposite polarity charge which is proportional to the charge on the preceding print drop. As a result, the cross talk effect from a preceding print drop on the next formed print drop is effectively canceled by the opposite polarity cross talk effect from the intermediate, charged guard drop.

It will be appreciated that a large number of other factors affect the accuracy with which drops of ink are deposited on a moving print receiving medium. Such factors, among others, include fluctuation in the masses of the drops produced in the jet drop streams; fluctuations in stream velocity due to changes in ink temperature, pressure, and viscosity; manufacturing error in the position and straightness of the orifices; inaccuracy of the timing of the charge electrode voltages; fluctuations in the velocity of the moving print receiving medium; and the fluctuations in stream velocity due to the aerodynamic effects of drops upon each other among others.

It has been recognized, however, that some of these sources of error can be minimized by reducing, to as large a degree as practical, the amount of deflection of the print drops. U.S. Pat. No. 4,060,804, issued Nov. 29, 1977, to Yamada shows an ink jet printer having two ink jet nozzles. Each nozzle prints along a separate band of the print receiving medium, with the bands abutting along a "seam". Yamada recognizes that the accuracy of drop placement is most important along the seam, since errors here in drop placement will be readily apparent to the observer as discontinuities in the printed image. In order to provide for the least amount of error, Yamada recognizes that the highest accuracy of drop placement results from deflecting the print drops by the least amount and, therefore, prints adjacent the seam with drops from each of the nozzles which are deflected by the minimum amount necessary to clear the drop catchers. It will be appreciated, however, that the Yamada disclosure relates to an ink jet printer construction which is uniquely limited to a two-nozzle design and, further, that the improved drop placement accuracy is effected only along one edge of each of the bands.

U.S. Pat. No. 3,596,275, issued July 27, 1971, to Sweet, in FIGS. 11, 12*a*, 12*b*, and 13, discloses an arrangement in which pairs of guard drops intermediate successive single print drops receive a sufficiently high charge such that they are deflected by a static electric deflection field to a catcher. The drops which are used for printing, as seen in FIG. 12*a*, are apparently charged in a bipolar fashion, since they are deflected toward either the positive or negative deflection electrode. The Sweet disclosure relates to a single jet printer in which the drops from the jet are required to be deflected substantially in order to strike the print positions which are widely spaced across the print receiving medium. As indicated by FIG. 11, and by the accompanying description, the device operates as an oscillograph; it receives a bipolar, fluctuating electrical charge signal and prints a curve representative of the fluctuations in this signal.

Accordingly, it is seen that there is a need for an ink jet printer in which the effects of drop-to-drop cross talk within a jet are compensated and, additionally, in which the accuracy of drop placement on the print receiving medium is improved by deflecting the drops only slightly.

SUMMARY OF THE INVENTION

An ink jet printer for depositing drops of ink at a plurality of print positions on a moving print receiving medium includes print head means for producing at least one jet drop stream of drops directed toward the medium. Charge electrode means is positioned adjacent the point of drop formation of the jet drop stream and a catcher means is provided for catching drops which are not to be deposited on the medium. A deflection field means provides an electric field through which drops in the jet drop stream pass. A charging means repetitively applies a relatively high guard drop potential to the charge electrode during formation of at least every second drop, for charging of at least every second drop to a guard charge level. The charging means, during formation of the remainder of the drops, selectively applies to the charge electrode either one of a number of relatively low print potentials for bipolar charging of the remainder of the drops to an associated one of a number of relatively low print charge levels, or a substantially larger catch potential for charging of the remainder of the drops to a catch charge level. The guard drop potential, the print potential, and the catch potential are all of the same electrical polarity with respect to the print head means, with bipolar charging of the drops resulting from drop-to-drop cross talk from previously formed drops carrying a guard charge level. The drops carrying a guard charge level and the drops carrying a catch charge level are deflected by the deflection field to the catcher means and drops carrying the print charge levels are deflected by the field to associated print positions on the medium.

The charging means may include means for repeatedly applying the guard drop potential to the charge electrode during formation of two successive drops intermediate successive applications of the catch or print potentials to the charge electrode. Each application of the catch or print potential to the charge electrode may occur during the time required for formation of a single drop.

The deflection field means may include means for providing a static electric field, whereby drops carrying the print charge levels are deflected from the initial trajectory of the jet drop stream parallel to the field and in directions dependent upon the polarities of charges carried by the drops. The field may extend in a direction which is oblique with respect to the direction of movement of the print receiving medium.

The ink jet printer may include print head means for generating a plurality of jet drop streams directed toward the print receiving medium with the streams being positioned along a row which is skewed with respect to the direction of movement of the medium. A plurality of charge electrodes is provided with each such electrode positioned adjacent to the point of drop formation of an associated one of the jet drop streams for selectively inducing electrical charges on the drops in the streams in dependence upon the voltage potentials applied to the deflection electrodes. The charging means repetitively applies a guard drop potential to the electrodes during formation of at least every second drop in each jet drop stream, and selectively applies to said electrodes either one of a plurality of print potentials or a catch potential during formation of the remainder of the drops in each jet drop stream. The print potentials, catch potential and guard drop potential are all of the same electrical polarity with respect to the print head means, and the print potentials are substantially less than the guard drop potential.

The catcher means is positioned between the print head means and the medium and to one side of the row of jet drop streams and catches drops deflected thereto. The deflection field means provides an electric deflection field through which the jet drop streams pass. The field extends generally parallel to the medium and perpendicular to the row. Drops charged by the catch potential are deflected to strike the catcher means, drops charged by the guard drop potential are deflected to strike the catcher means, and drops charged by the print potentials are deflected to either side of the row to associated print positions on the medium.

The charging means includes means for repeatedly applying the guard drop potential to the charge electrodes during formation of two successive drops intermediate successive applications of the catch or print potentials to the charge electrodes. The deflection field means includes means for providing a static electric field, whereby drops carrying the print charge levels are deflected from the initial trajectories of the jet drop streams parallel to the field, and in a direction dependent upon the polarity of the charges carried by the drops.

The invention further includes the method of controlling the deposit of drops from at least one ink jet drop stream on a moving print receiving medium by bipolar charging of the drops utilizing a charge electrode positioned adjacent to the jet drop stream near the point of drop formation. The method includes the steps of producing a jet drop stream of drops directed toward the medium, applying a guard drop potential to the electrode during formation of at least every second drop, and applying selectively either one of a number of print potentials or a catch potential to the electrode during formation of the remainder of the drops. The drops which are formed during application of the guard drop potential to the electrode carry a guard charge level. The drops which are formed during application of the catch potential to the electrode carry a catch charge level. Finally, the drops which are formed during application of the print potentials to the electrode carry corresponding bipolar print charge levels. The guard drop, catch, and print potentials all are unipolar and the guard drop potential has a substantially greater magnitude than the print potentials. The magnitude and polarity of a charge induced in a drop during application of a print potential to the electrode are a function of the electric field produced by the print potential and the electric field produced by the guard charge level carried by the previously formed drop.

The step of applying a guard drop potential to the electrode may include the step of applying the guard drop potential to the electrode during formation of at least one drop between successive applications of the print potentials or the catch potential to the electrode. The method may further include the step of providing an electric deflection field through which the drops pass, whereby the drops are deflected parallel to the field by an amount dependent upon the charge level carried by the drops and in a direction dependent upon the polarity of the charge level. The electric field may be static and the method may further include the step of providing a catcher means adjacent the stream and positioned so as to intercept drops carrying a catch charge level or a guard charge level and preclude such drops from deposit upon the print receiving medium.

Accordingly, it is an object of the present invention to provide such a printer and printing method in which weakly charged print drops are produced intermediate more highly charged guard drops; to provide such a printer and printing method in which the print drops carry charges of both positive and negative polarity; and to provide such a printer and printing method in which the print drops are weakly charged to either a positive or negative polarity as a result of drop-to-drop cross talk from previously charged guard drops.

DETAILED DESCRIPTION OF THE PREFERRED EMBODIMENT

Figure 1:
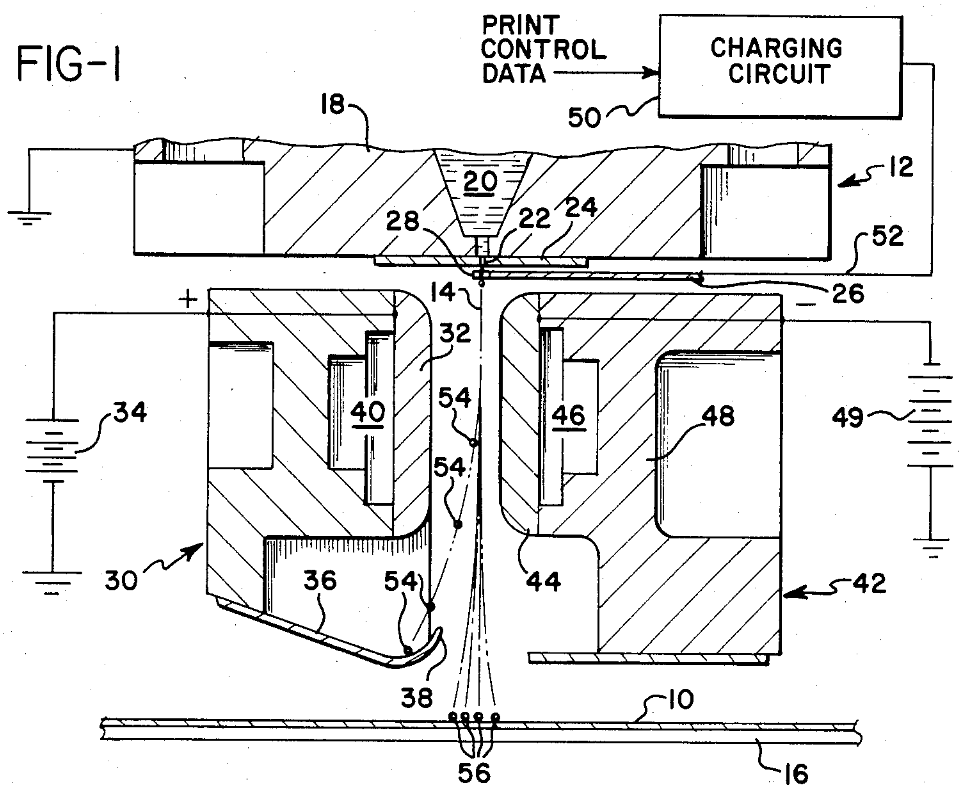
FIG. 1 is a sectional view of a multiple jet ink printer according to the present invention, taken in a plane generally normal to a row of jet drops streams produced by the printer.

FIG. 1 of the drawings illustrates an ink jet printer according to the present invention which deposits drops of ink at a plurality of print positions on a moving print receiving medium 10. A print head means 12 produces at least one jet drop stream 14 of drops which are directed toward the moving print receiving medium 10. Medium 10 may, for example, be a sheet of paper carried by a belt transport 16. The print head means includes a manifold 18 which defines a fluid reservoir 20. Reservoir 20 communicates with at least one orifice 22 such that fluid supplied to the reservior 20 under pressure emerges from the orifice 22 in orifice plate 24 to form the jet drop stream 14. The formation of drops in the stream is typically enhanced by applying mechanical vibrational energy to the print head, the orifice plate, or coupling this energy to the ink in the reservoir 20. For this purpose, a piezoelectric transducer may advantageously be used. In the preferred embodiment, a plurality of jet drop streams 14 are produced by a number of orifices 22 which are positioned in a row 26 (FIG. 2) along a line which is skewed with respect to the direction of movement of the print receiving medium. FIG. 1 is a sectional view of the printer taken along a line generally perpendicular to row 26.

The printer further comprises a charge electrode means, including a charge electrode plate 26 which defines a plurality of notches along one edge thereof.

Each of the notches is lined with electrically conductive material which forms a charge electrode 28. Each electrode 28 is electrically connected to a respective one of a number of printed circuit conductors on plate 26. The charge electrode is positioned adjacent the point of drop formation of the jet drop stream 14 such that charges may be induced in the drops formed in the stream by impressing a charge potential on the electrode 28.

A catcher means 30 is provided for catching drops which are not to be deposited upon the print receiving medium 10. Catcher means 30 includes a porous metal member 32 upon which a positive electrical potential is impressed by voltage source 34. Catcher means 30 further includes a catcher plate 36 which defines a lip 38 extending to a position relatively close to the initial trajectory of the jet drop stream 14. Drops which strike the plate 36 are carried away by an appropriate liquid suction arrangement and may be collected and returned to the print head 12 for reuse. Additionally, chamber 40 behind plate 32 receives a partial vacuum from a vacuum pump so as to ingest ink drops into chamber 40 when such drops strike the surface of plate 32. The ink drawn into chamber 40 is removed from the chamber by the vacuum source.

A deflection field means includes deflection electrode 42, having porous electrode plate 44 covering vacuum chamber 46 defined by member 48. The deflection field means further includes potential source 49 which is electrically connected to plate 44. Ink mist which may collect on the surface of plate 44 is ingested through the porous plate and carried away by a vacuum source connected to the chamber 46. By virtue of the difference in electrical potential between the plates 32 and 44, an electric field between these plates is created through which drops in the jet drop stream pass.

A charging means, including circuit 50, is electrically connected to the charge electrode 28 via line 52 and a printed circuit conductor on plate 26. Circuit 50 provides a charging potential to the charge electrode so as to induce an electrical charge on the tip of the fluid filiment emerging from the orifice 22. The charge is carried away by a drop when the drop is formed from the fluid filiment tip.

The charging means repetitively applies a relatively high guard drop potential to the charge electrode during formation of at least every second drop, for charging of every second drop to a guard charge level. During formation of the remainder of the drops, the circuit 50 selectively applies to the charge electrode 28 either one of a number of relatively low print potentials for bipolar charging of the drops to an associated one of a number of relatively low print charge levels, or a substantially larger catch potential for charging the remainder of the drops to a catch charge level. The guard drop, print, and catch potentials are of the same electrical polarity with respect to the print head means. As explained more fully below, bipolar charging of the drops results from drop-to-drop cross talk from previously formed drops carrying a guard charge level.

Figure 2:
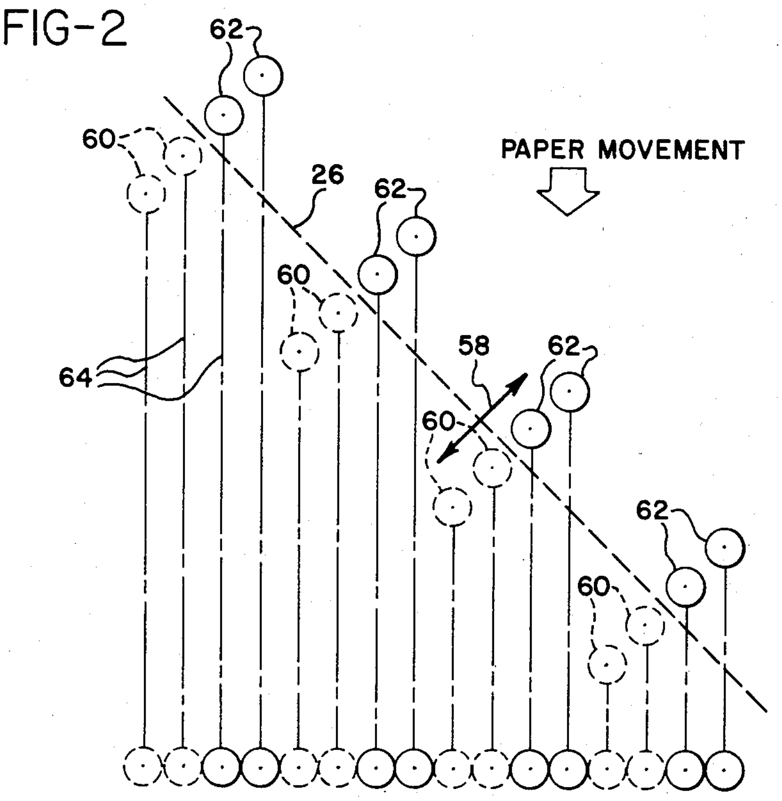
FIG. 2 is a diagramatic representation of the pattern of print positions serviced by the printer, the orientation of the row of jets with respect to the print receiving medium, and the direction of movement of the medium.

Drops, such as those indicated at 54, carrying a guard charge level and other drops carrying a catch charge level are deflected by the field between the plates 32 and 46 to the catcher means 30. Drops carrying any of the print charge levels, such as drops 56, are deflected by the field to associated print positions on the medium. As seen in FIG. 2, the deflection field extends between plates 32 and 44 in the direction of arrow 58, i.e., perpendicular to the row of jet drop streams. The deflection of the drops is parallel to the field, and therefore normal to the row. As may be seen, drops from each jet drop stream are deflected to either side of the row 26, with negatively charged drops being deflected downward and to the left as seen in FIG. 2 to the print positions indicated by the dashed circles 60, while the positively charged drops are deflected upward and to the right as seen in FIG. 2 to the print positions depicted by the solid circles 62. By depositing drops at print positions 60 and 62, a plurality of columns 64 of drops may be printed on the medium 10. Selective deposit of the drops at the print positions results in print images being formed collectively by the drops.

Toward this end, each jet drop stream produces at least one guard drop between each successive print or catch drop. It will be appreciated that in some printers two or more successive guard drops may be produced between successive print or catch drops. If a print potential is applied to the charge electrode so as to result in a print charge level being impressed upon the drop then being formed, the drop is deflected by the electric field acting on the relatively weak print charge level to one of the four print positions associated with the jet. Deflection occurs in a direction normal to the row of jet drop streams, and a relatively small amount of deflection is provided, thus increasing the accuracy with which the drops are deposited at the print positions. If, however, the print position which would otherwise receive a drop is intended to remain free of ink, a catch potential is applied to the electrode, producing a catch charge level on the drop. Such a drop is deflected to the catcher 30 in precisely the same manner that guard drops are deflected to the catcher 30.

Figure 3:
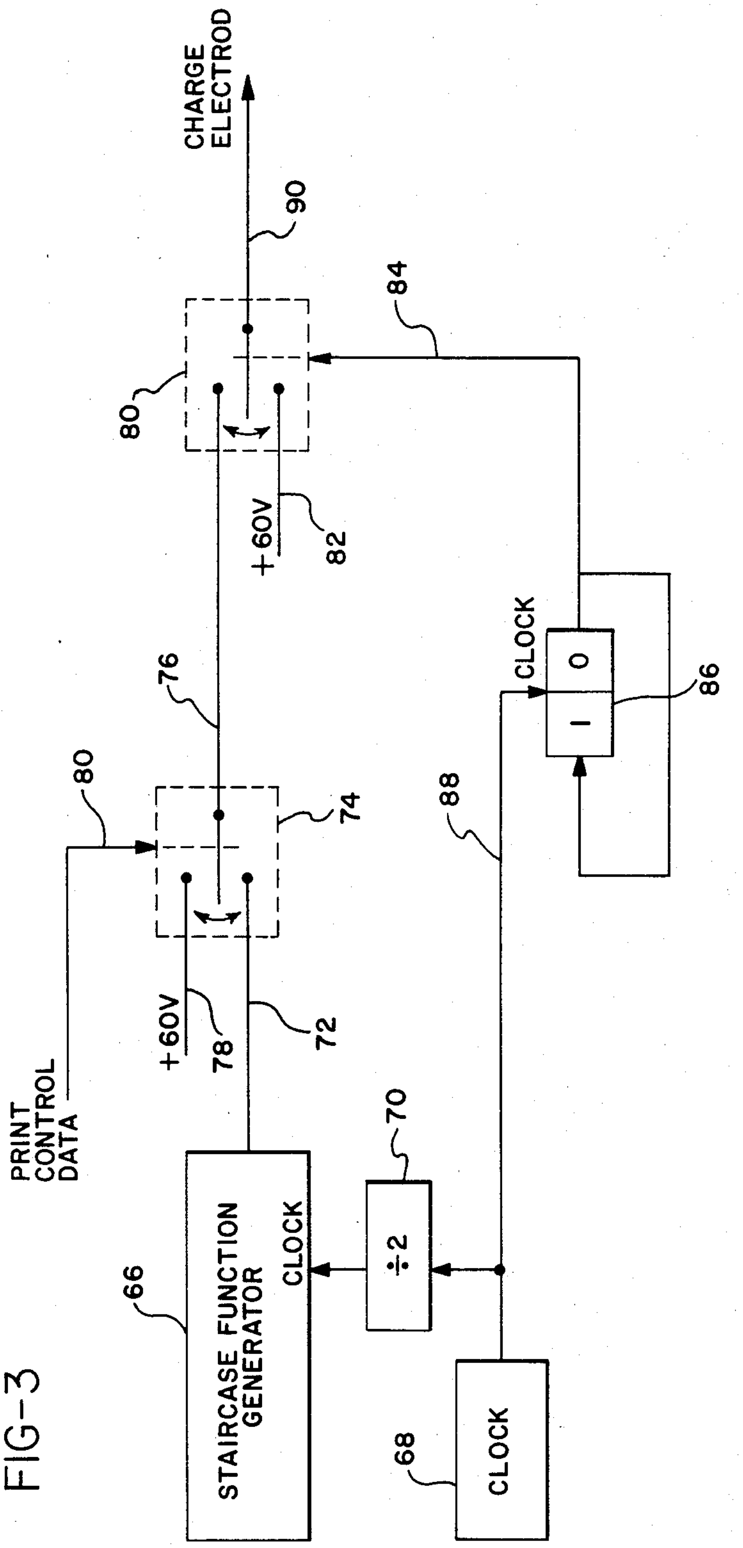
FIG. 3 is a block diagram, illustrating the charging control circuitry of the printer.
Figure 4:
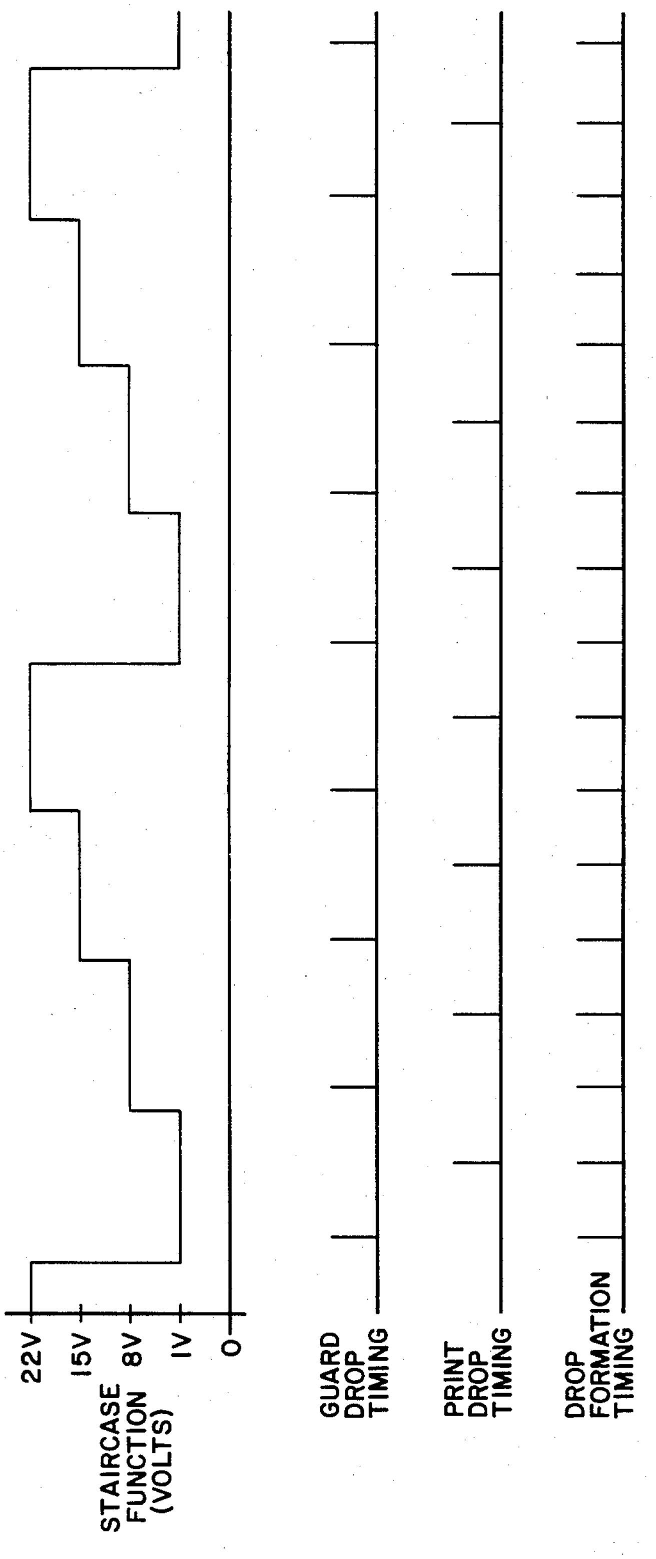
FIG. 4 is a timing diagram illustrating the timing relationships between the output of the step function generator, and the production of charge drops, print drops and drop formation.

Circuitry which may be used to control charging of a single jet drop stream is depicted in FIG. 3, and its function explained by the timing diagram shown in FIG. 4. A staircase function generator 66 receives clock pulses from clock 68 via divide-by-two circuit 70 such that it provides an output to line 72 as shown in FIG. 4. Clock 68 is synchronized to the drop formation frequency of the printer. The staircase function generator output therefore changes voltage level at one half the drop formation frequency of the printer, thus providing each successive voltage at its output during formation of two drops.

Switch circuit 74 provides on its output 76 either the input potential received on line 72 or the input potential received on line 78, with the selection being controlled by a control input 80. Switch 74 is illustrated as a mechanical switch, but it is preferable that a transistor switching circuit be used to perform this function. Applied to input 80 is a sequence of binary print control signals. The print control signals, defining the image to be printed by the jet drop stream, may be produced by a computer, by a photoptical scanner which scans an original document which is to be reproduced, or by any other suitable signal source. A "1" on line 80 causes the switch to switch into its lower switching position, connecting line 72 with line 76. A "0" on line 80 results in switch 74 switching into its upper switching position in which line 78 is connected to line 76. Line 78 is connected to a relatively high +60 volt D.C. source.

A "0" on line 80 indicates that a drop is not to be deposited at the print position then being serviced by the jet. As a consequence that +60 volt D.C. potential will ultimately be applied to the charge electrode, causing the drop then being formed to carry a catch charge level. If, on the other hand, the drop is to be deposited at the print position, the "1" on line 80 causes the staircase function generator output from line 72 to be connected to line 76 and, ultimately, to the charge electrode for charging the drop to a lower print charge level, a level which causes the drop to be deflected to the desired print position.

As discussed previously, a guard drop carrying a guard charge level is created between production of successive print or catch drops. In order to provide for the application of a guard drop potential to the charge electrode, switch circuit 80 is provided with line 76 being connected as one of its inputs and a +60 volt D.C. guard drop potential being applied to its other input via line 82. The control for switch circuit 80 is provided on line 84 by a shift register 86 having its output connected to its input and being loaded with a "10" pattern. Shift register 86 is clocked at the drop formation frequency by clock signals applied to line 88. By this arrangement, switch 80 is switched into its lower switching position, connecting the guard drop potential of +60 volts D.C. from line 82 to its output line 90 during the formation of second drop and only connecting line 76, carrying a print potential or catch potential, to line 90 during the formation of every other drop. Line 90 is connected to the associated charge electrode via appropriate driver amplifier circuitry. It will be appreciated that provision for two guard drops between successive print drops may be made, for example, by substituting a three stage shift register for register 86, loading it with a "110" pattern, and using a divide-by-three circuit in place of circuit 70.

As seen in FIG. 4, this arrangement results in a guard drop and then a print drop (or alternately a catch drop, depending upon the image being printed) being formed while the staircase function output on line 72 remains at each successive voltage step. As may be noted, the staircase function steps from +1 volts D.C. to +22 volts in 7 volt increments and then repeats this process. Thus, the print potential supplied to the charge electrode during formation of print drops are all of a positive polarity.

The charge electrode 20 consists of a plated notch in the edge of plate 26. In view of the fact that this notch does not entirely surround the fluid filiment as the drop is being formed, cross talk from the earlier formed guard drop occurs each time a print drop is being formed. It will be appreciated that the guard drops are formed while a relatively large guard drop potential of +60 volts D.C. is impressed upon the charge electrode. As a consequence, the guard drops carry a substantial negative charge level. The negative charge from a prior guard drop in turn tends to induce a positive charge on the subsequently formed print drop. The somewhat lower print potentials, being positive in polarity, however, tend to counteract this drop-to-drop cross talk and tend to induce a negative charge level on the print drop. When the higher print potentials of 15 and 22 volts D.C. are applied to the charge electrode, the drop-to-drop cross talk from the previously formed guard drop is overcome sufficiently to produce a net negative charge on the print drop. When, however, the lower print potentials of 1 and 8 volts D.C. are applied to the charge electrode, the drops then formed receive a positive net charge due to the fact that the relatively weaker print potentials are not sufficient to overcome the positive charging effect of a guard drop.

The present invention provides a number of advantages and, in particular, improves the quality of the print image by producing very accurate placement of the print drops. As seen in FIGS. 1 and 2, the drops which are to be deposited upon the print receiving medium are deflected slightly to either side of the initial straight trajectory of the jet drop stream. Since the amount of deflection of the print drops is small, the resulting accuracy in their placement on the medium is improved. The deflection of the drops in both directions is accomplished by bipolar charging of the drops. This charging is, however, accomplished with print potentials which are all of the same charge polarity, thus simplifying the charging circuitry. As discussed previously, this bipolar charging results from the use of the charging effect of the previously formed guard drops on the print drops. Thus while not eliminating drop-to-drop cross talk, the printer of the present invention makes use of it in such a manner that it has no deleterious effect upon printing accuracy and, indeed, is an integral part of the charging process of the print drops.

It should be understood that the present invention is not limited to ink jet printers which use a single guard drop between successive print drops. Rather, the invention will also find application in printers which use two, three, or more guard drops between successive print drops.

While the method herein described, and the form of apparatus for carrying this method into effect, constitute preferred embodiments of the invention, it is to be understood that the invention is not limited to this precise method and form of apparatus, and that changes may be made therein without departing from the scope of the invention.

What is claimed is:

1. An ink jet printer for depositing drops of ink at a plurality of print positions on a moving print receiving medium, comprising:

print head means for producing at least one jet drop stream of drops directed toward a moving print receiving medium, charge electrode means positioned adjacent the point of drop formation of said jet drop stream, catcher means for catching drops which are not to be deposited on said medium, deflection field means for providing an electric field through which drops in said jet drop stream pass, and charging means for repetitively applying a relatively high guard drop potential to said charge electrode during formation of at least every second drop for charging of said at least every second drop to a guard charge level, and, during formation of the remainder of said drops, selectively applying to said charge electrode either one of a number of relatively low print potentials for bipolar charging of said remainder of said drops to an associated one of a number of relatively low print charge levels, or a substantially larger catch potential for charging of said remainder of said drops to a catch charge level, said guard drop, print and catch potentials being of the same electrical polarity with respect to said print head means, and bipolar charging of said drops resulting from drop-to-drop cross talk from previously formed drops carrying a guard charge level, whereby drops carrying a guard charge level and drops carrying a catch charge level are deflected by said field to said catcher means and drops carrying any of said print charge levels are deflected by said field to associated print positions on said medium.

2. The ink jet printer of claim 1 in which said charging means includes means for repeatedly applying said guard drop potential to said charge electrode during formation of a single guard drop intermediate successive applications of said catch or print potentials to said charge electrode.

3. The ink jet printer of claim 2 in which each successive application of said catch or print potentials to said charge electrode occurs during the time required for formation of a single drop.

4. The ink jet printer of claim 1 in which said deflection field means includes means for providing a static electric field, whereby drops carrying said print charge levels are deflected from the initial trajectory of said jet drop stream parallel to said field and in a direction dependent upon the polarity of the charges carried by the drops.

5. The ink jet printer of claim 1 in which said field extends in a direction which is oblique with respect to the direction of movement of said print receiving medium.

6. An ink jet printer for depositing ink drops at print positions on a moving print receiving medium, comprising:

print head means for generating a plurality of jet drop streams directed toward said moving print receiving medium, said streams being positioned along a row which is skewed with respect to the direction of movement of said medium, a plurality of charge electrodes, each such electrode positioned adjacent the point of drop formation of an associated one of said jet drop streams, for selectively inducing electrical charges on the drops in said streams in dependence upon the voltage potentials applied to said charge electrodes, charging means for repetitively applying a guard drop potential to said electrodes during formation of at least every second drop in each jet drop stream, and selectively applying to said electrodes either one of a plurality of print potentials or a catch potential during formation of the remainder of the drops in each jet drop stream, said print potentials, said catch potential and said guard drop potential all being of the same electrical polarity with respect to said print head means, and said print potentials being substantially less than said guard drop potential, catcher means, positioned between said print head means and said medium and to one side of said row of jet drop streams, for catching drops deflected thereto, and deflection field means for providing a static electric deflection field through which said jet drop streams pass, said field extending generally parallel to said medium and perpendicular to said row, whereby drops charged by said catch potential are deflected to strike said catcher means, drops charged by said guard drop potential being deflected to strike said catcher means, and drops charged by said print potentials are deflected to either side of said row to associated print positions on said medium.

7. The ink jet printer of claim 6 in which said charging means includes means for repeatedly applying said guard drop potential to said charge electrodes during formation of a single guard drop intermediate successive applications of said catch or print potentials to said charge electrodes.

8. The ink jet printer of claim 7 in which each successive application of said catch or print potentials to said charge electrodes occurs during the time required for formation of a single drop.

9. The ink jet printer of claim 6 in which said deflection field means includes means for providing a static electric field, whereby drops carrying said print charge levels are deflected from the initial trajectories of said jet drop streams parallel to said field and in a direction dependent upon the polarity of the charges carried by the drops.

10. The ink jet printer of claim 6 in which said field extends in a direction which is oblique with respect to the direction of movement of said print receiving medium.

11. The method of controlling the deposit of drops from at least one ink jet drop stream on a moving print receiving medium by bipolar charging of the drops utilizing a charge electrode positioned adjacent to said jet drop stream near the point of drop formation, comprising:

producing a jet drop stream of drops directed toward said medium, applying a guard drop potential to said electrode during formation of at least every second drop, such that the drops which are formed during application of said guard drop potential to said electrode carry a guard charge level, and applying selectively either one of a number of print potentials or a catch potential to said electrode during formation of the remainder of said drops, such that the drops which are formed during application of said catch potential to said electrode carry a catch charge level and the drops which are formed during application of said print potentials to said electrode carry corresponding bipolar print charge levels, said guard drop, catch, and print potentials all being unipolar and said guard drop potential having a substantially greater magnitude than said print potentials, whereby the charge level and the polarity thereof induced in a drop during application of a print potential to said electrode are a function of the electric field produced by the print potential and the electric field produced by the guard charge level carried by the previously formed drop.

12. The method of claim 11 in which the step of applying a guard drop potential to said electrode includes the step of applying said guard drop potential to said electrode during formation of at least two drops between successive application of said print potentials or said catch potential to said electrode.

13. The method of claim 11 further comprising the step of providing an electric deflection field through which said drops pass, whereby said drops are deflected parallel to said field by an amount dependent upon the charge level carried by the drops and in a direction dependent upon the polarity of the charge level.

14. The method of claim 13 in which said electric deflection field is static.

15. The method of claim 14 further comprising the step of providing a catcher means adjacent said stream and positioned so as to intercept drops carry a catch charge level or a guard charge level and preclude such drops from deposit upon said print receiving medium.

16. An ink jet printer for depositing drops of ink at a plurality of print positions on a moving print receiving medium, comprising:

print head means for producing at least one jet drop stream of drops directed toward a moving print receiving medium, charge electrode means positioned adjacent the point of drop formation of said jet drop stream, catcher means for catching drops which are not to be deposited on said medium, deflection field means for providing an electric field through which drops in said jet drop stream pass, and charging means for repetitively applying a relatively high potential to said charge electrode during formation of at least every second drop for charging of said at least every second drop to a relatively high charge level, and, during formation of the remainder of said drops, selectively applying to said charge electrode either one of a number of relatively low print potentials for bipolar charging of said remainder of said drops to an associated one of a number of relatively low print charge levels, or a relatively high potential for charging of said remainder of said drops to a relatively high charge level, the electric potentials applied to said charge electrode means being of the same electrical polarity with respect to said print head means, and bipolar charging of said drops resulting from drop-to-drop cross talk from previously formed drops carrying a relatively high charge level, whereby drops carrying a relatively high charge level are deflected by said field to said catcher means and drops carrying any of said print charge levels are deflected by said field to associated print positions on said medium.

17. The ink jet printer of claim 16 in which said charging means includes means for repeatedly applying said relatively potential to said charge electrode during formation of at least two successive drops intermediate successive applications of said print potentials to said charge electrode means.

18. The ink jet printer of claim 17 in which each successive application of said print potentials to said charge electrode occurs during the time required for formation of a single drop.

19. The ink jet printer of claim 16 in which said deflection field means includes means for providing a static electric field, whereby drops carrying said print charge levels are deflected from the initial trajectory of said jet drop stream parallel to said field and in a direction dependent upon the polarity of the charges carried by the drops.

20. The ink jet printer of claim 16 in which said field extends in a direction which is oblique with respect to the direction of movement of said print receiving medium.

* * * * *